United States Patent Office 2,703,802
Patented Mar. 8, 1955

2,703,802

4-(TRIFLUOROACETYL) MORPHOLINE

Ted R. Norton, Midland, Mich., assignor to The Dow Chemical Company, Midland, Mich., a corporation of Delaware No Drawing. Application August 20, 1953, Serial No. 375,563

1 Claim. (Cl. 260—247.2)

This invention is concerned with a novel chemical compound and is particularly directed to the compound 4-(trifluoroacetyl)morpholine having the formula

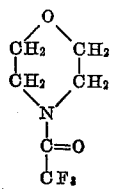

This compound has been prepared and isolated and found to have value as a soil sterilant.

In a representative preparation, 28.75 grams (0.33 mole) of morpholine was placed in a glass-lined reactor vented through a water-cooled condenser and equipped with means for external heating. 52.6 grams (0.3 mole) of ethyl trifluoroacetate was added portionwise with agitation to the morpholine over a period of ten minutes. During the addition, the temperature in the reactor increased from 25° to 60° C. The reactor and contents were then heated to a boiling temperature of about 93° C. for a period of two hours, and thereafter cooled to room temperature.

The crude reaction product was fractionally distilled under reduced pressure to recover a mixture of ethanol, morpholine and ester reactant boiling under 90° C. at 105 millimeters' pressure, and 50.7 grams of 4-(trifluoroacetyl)morpholine boiling at 90°–91.3° C. at 16.7 millimeters' pressure. This represented a yield of 90 percent of theory. The compound 4-(trifluoroacetyl)morpholine was found to have a specific gravity of 1.3616 at 25°/25° C. and a refractive index $n/D$ 31.85° C. of 1.4151. The compound contained 7.5 percent by weight nitrogen by analysis compared to a theoretical nitrogen content of 7.65 percent.

4-(trifluoroacetal)morpholine was employed as a soil sterilant. In this operation, a plot of soil was sown with the seed of black mustard (*Brassica nigra*). 24 hours after sowing, a portion of the plot was treated with 4-(trifluoroacetyl)morpholine in dosage to yield 200 parts of the compound per million parts of soil. 4 weeks after treatment, examination indicated no germination of the mustard seed planted in the treated area. In the untreated check area, the mustard seed had germinated to produce a thick stand of thrifty plants.

I claim:

The compound 4-(trifluoroacetyl)morpholine having the formula

and boiling at 90°–91.3° C. at 16.7 millimeters' pressure.

No references cited.